(12) United States Patent
Norton et al.

(10) Patent No.: US 11,979,803 B2
(45) Date of Patent: May 7, 2024

(54) RESPONDING TO A SIGNAL INDICATING THAT AN AUTONOMOUS DRIVING FEATURE HAS BEEN OVERRIDDEN BY ALERTING PLURAL VEHICLES

(71) Applicant: Lenovo (Singapore) Pte. Ltd., Singapore (SG)

(72) Inventors: Robert Norton, Raleigh, NC (US); Robert J. Kapinos, Durham, NC (US); Russell Speight VanBlon, Raleigh, NC (US); Scott Wentao Li, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 16 days.

(21) Appl. No.: 18/055,346

(22) Filed: Nov. 14, 2022

(65) Prior Publication Data
US 2023/0077159 A1    Mar. 9, 2023

Related U.S. Application Data

(62) Division of application No. 16/793,184, filed on Feb. 18, 2020, now abandoned.

(51) Int. Cl.
| | |
|---|---|
| *H04W 4/44* | (2018.01) |
| *G05D 1/00* | (2006.01) |
| *G06F 3/04847* | (2022.01) |
| *H04L 12/18* | (2006.01) |
| *H04L 67/12* | (2022.01) |
| *H04L 67/52* | (2022.01) |

(52) U.S. Cl.
CPC ............ *H04W 4/44* (2018.02); *G05D 1/0061* (2013.01); *G05D 1/0088* (2013.01); *G06F 3/04847* (2013.01); *H04L 12/1895* (2013.01); *H04L 67/12* (2013.01); *H04L 67/52* (2022.05)

(58) Field of Classification Search
CPC ..... H04W 4/44; G05D 1/0061; G05D 1/0088; G05D 2201/0213; G05D 1/0044; G06F 3/04847; H04L 12/1895; H04L 67/12; H04L 67/52; B60W 50/14; B60W 2050/0073; B60W 2556/45; B60W 2756/10; B60W 60/0053

See application file for complete search history.

(56) References Cited

U.S. PATENT DOCUMENTS

| | | | |
|---|---|---|---|
| 9,188,985 B1 | 11/2015 | Hobbs et al. | |
| 9,970,615 B1 | 5/2018 | Cardillo et al. | |
| 10,309,789 B2 | 6/2019 | Ramasamy | |
| 2011/0109469 A1* | 5/2011 | Trim | G08B 21/22 340/686.6 |

(Continued)

FOREIGN PATENT DOCUMENTS

| | | |
|---|---|---|
| WO | 2017068897 A1 | 4/2017 |
| WO | 2018026603 A1 | 2/2018 |

*Primary Examiner* — Yuen Wong
(74) *Attorney, Agent, or Firm* — John M. Rogitz; John L. Rogitz

(57) ABSTRACT

In one aspect, a device includes at least one processor and storage accessible to the at least one processor. The storage includes instructions executable by the at least one processor to receive at least one override signal of at least a first autonomous driving feature of a vehicle, disable the first autonomous driving feature responsive to the override signal, and wirelessly transmit to at least a first computer server a signal indicating that the override signal was received.

20 Claims, 4 Drawing Sheets

VEHICLE LOGIC

(56) References Cited

U.S. PATENT DOCUMENTS

| | | |
|---|---|---|
| 2011/0143726 A1 | 6/2011 | Silva |
| 2014/0026065 A1 | 1/2014 | Wang |
| 2014/0195072 A1* | 7/2014 | Graumann ............... G08G 1/22 455/66.1 |
| 2014/0309864 A1 | 10/2014 | Ricci |
| 2016/0280236 A1 | 9/2016 | Otsuka |
| 2017/0008523 A1 | 1/2017 | Christensen et al. |
| 2017/0219364 A1 | 8/2017 | Lathrop et al. |
| 2017/0259832 A1 | 9/2017 | Lathrop et al. |
| 2017/0301235 A1 | 10/2017 | Endo |
| 2017/0314957 A1 | 11/2017 | Mimura et al. |
| 2017/0370740 A1 | 12/2017 | Nagy et al. |
| 2018/0100742 A1 | 4/2018 | Greenwood et al. |
| 2018/0113460 A1 | 4/2018 | Koda et al. |
| 2018/0162387 A1 | 6/2018 | Sung et al. |
| 2018/0237012 A1 | 8/2018 | Jammoussi et al. |
| 2018/0252541 A1 | 9/2018 | Kesting et al. |
| 2018/0259956 A1 | 9/2018 | Kawamoto |
| 2018/0299281 A1 | 10/2018 | Takashima |
| 2019/0064804 A1* | 2/2019 | Frazzoli ............ B60W 60/0059 |
| 2020/0019165 A1* | 1/2020 | Levandowski .. G08G 1/096725 |

* cited by examiner

VEHICLE LOGIC

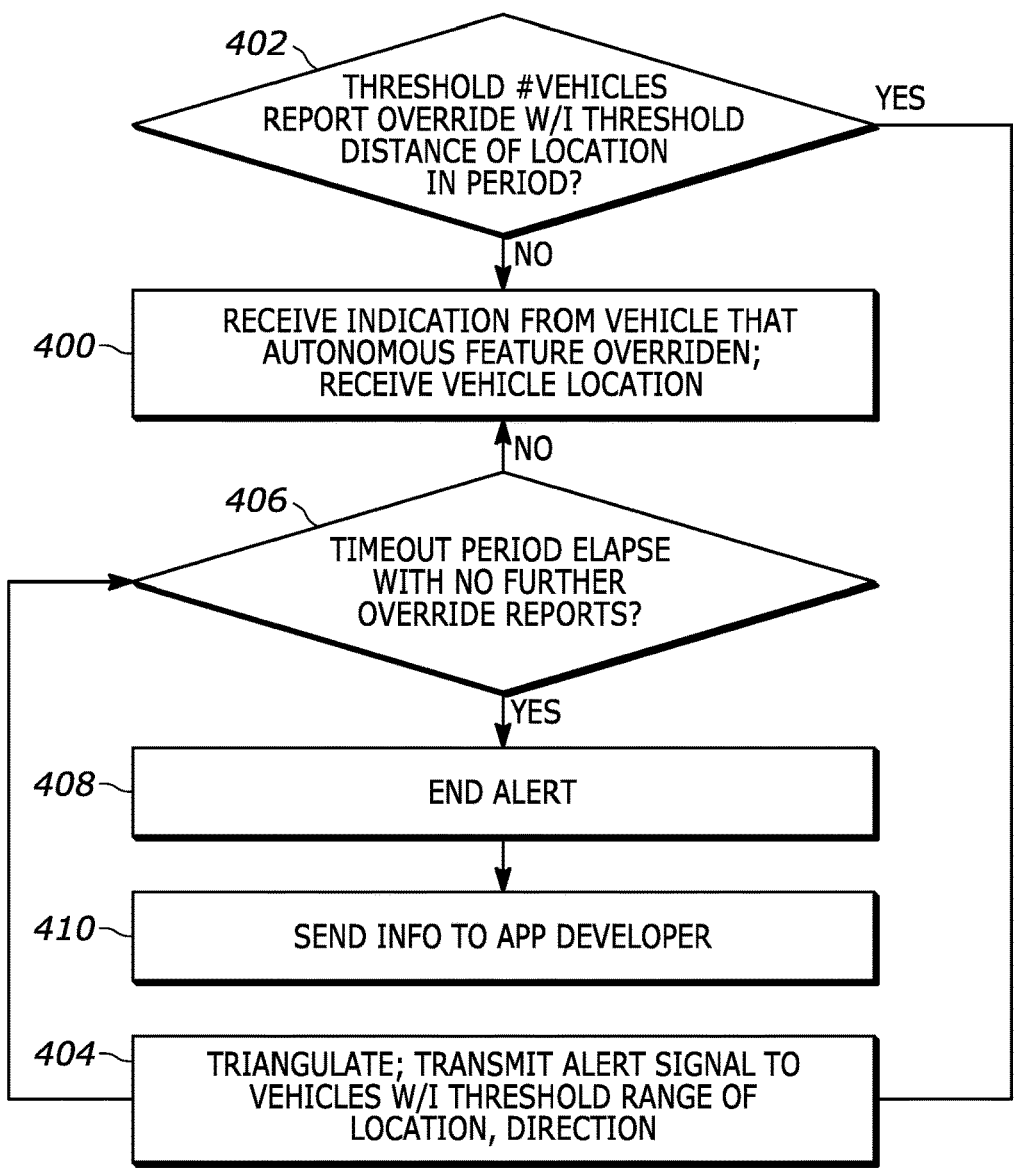
FIG. 4  SERVER LOGIC
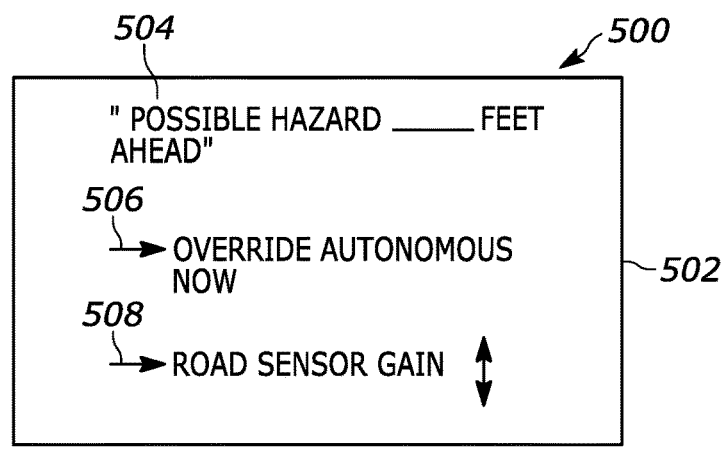
FIG. 5

RESPONDING TO A SIGNAL INDICATING THAT AN AUTONOMOUS DRIVING FEATURE HAS BEEN OVERRIDDEN BY ALERTING PLURAL VEHICLES

FIELD

The present application relates to technically inventive, non-routine solutions that are necessarily rooted in computer technology and that produce concrete technical improvements.

BACKGROUND

As recognized herein, travel applications executed in vehicles afford the opportunity to communicate items of interest wirelessly via the Internet ("cloud"), such as speed traps or road construction. In these cases, it is required of the encountering user to manually enter the appropriate information that then is sent to the cloud and disseminated from there to other drivers. Due to risk of distraction, indifference, and the use of many applications, the information is not efficiently reported from or to users.

There are currently no adequate solutions to the foregoing computer-related, technological problem.

SUMMARY

Accordingly, in one aspect a device includes at least one processor and storage accessible to the at least one processor. The storage includes instructions executable by the at least one processor to receive at least one override signal of at least a first autonomous driving feature of a vehicle, and responsive to the override signal, disable the first autonomous driving feature. The instructions also are executable to wirelessly transmit to at least a first computer server a signal indicating that the override signal was received.

In example embodiments the instructions are executable to, responsive to the override signal, wirelessly transmit to the first computer server a signal indicating a location of the vehicle associated with the override signal. The instructions can be executable to, responsive to the override signal, wirelessly transmit to the first computer server a signal indicating a time of the override signal and if desired a signal indicating a direction of travel of the vehicle. Also, in some implementations the instructions can be executable to, responsive to the override signal, increase a gain of at least one sensor of the vehicle.

In non-limiting embodiments the instructions are executable to, responsive to at least a first signal from a network server, present a user interface (UI) on at least one display in communication with the vehicle. The UI may include at least a selector selectable to disable at least one autonomous driving feature of the vehicle, and/or a selector selectable to alter a sensitivity of at least one sensor of the vehicle.

Still further, in some examples the device may include the vehicle.

In another aspect, at least one computer readable storage medium (CRSM) that is not a transitory signal includes instructions executable by at least one processor (in, for instance, a network server) to receive from a first vehicle a signal indicating that at least one autonomous driving feature of the first vehicle has been overridden. The instructions are executable to receive from the first vehicle indication of a location of the first vehicle, and responsive to the signal indicating that at least one autonomous driving feature of the first vehicle has been overridden and based at least in part on the location, transmit to plural vehicles a signal indicating an alert.

In examples, the instructions are executable to transmit to plural vehicles the signal indicating an alert responsive to the signal indicating that the at least one autonomous driving feature of the first vehicle has been overridden and responsive to determining that at least a first number of vehicles other than the first vehicle have reported respective overrides of respective autonomous driving features.

In examples, the instructions are executable to transmit to plural vehicles the signal indicating an alert responsive to the signal indicating that the at least one autonomous driving feature of the first vehicle has been overridden and responsive to determining that at least a first number of vehicles other than the first vehicle have reported respective overrides of respective autonomous driving features within a first distance of the location of the first vehicle.

In examples, the instructions are executable to transmit to plural vehicles the signal indicating an alert responsive to the signal indicating that the at least one autonomous driving feature of the first vehicle has been overridden and responsive to determining that at least a first number of vehicles other than the first vehicle have reported respective overrides of respective autonomous driving features within a first distance of the location of the first vehicle within a first period with respect to a time associated with the signal indicating that at least one autonomous driving feature of the first vehicle has been overridden.

In some embodiments the instructions are executable to stop transmitting to plural vehicles the signal indicating the alert responsive to not receiving indications of autonomous driving feature overrides within a timeout period. If desired, the instructions may be executable to provide to at least one developer of a driving application and/or an autonomous driving feature program indication of the signal indicating that at least one autonomous driving feature of the first vehicle has been overridden.

In another aspect, a method includes receiving from first and second vehicles respective signals indicating that at least one autonomous driving feature of the first and second vehicles has been overridden. The method also includes receiving from the first and second vehicles respective indications of locations of the first and second vehicles, and responsive to the signals from the first and second vehicles and responsive to the indications of the locations being within a first distance of each other, transmitting to plural vehicles a signal indicating an alert.

The details of present principles, both as to their structure and operation, can best be understood in reference to the accompanying drawings, in which like reference numerals refer to like parts, and in which:

BRIEF DESCRIPTION OF THE DRAWINGS

FIG. 4 is a flow chart of example server/cloud logic consistent with present principles; and FIG. 5 is a screen shot of an example user interface (UI) consistent with present principles.

DETAILED DESCRIPTION

Figure 1:
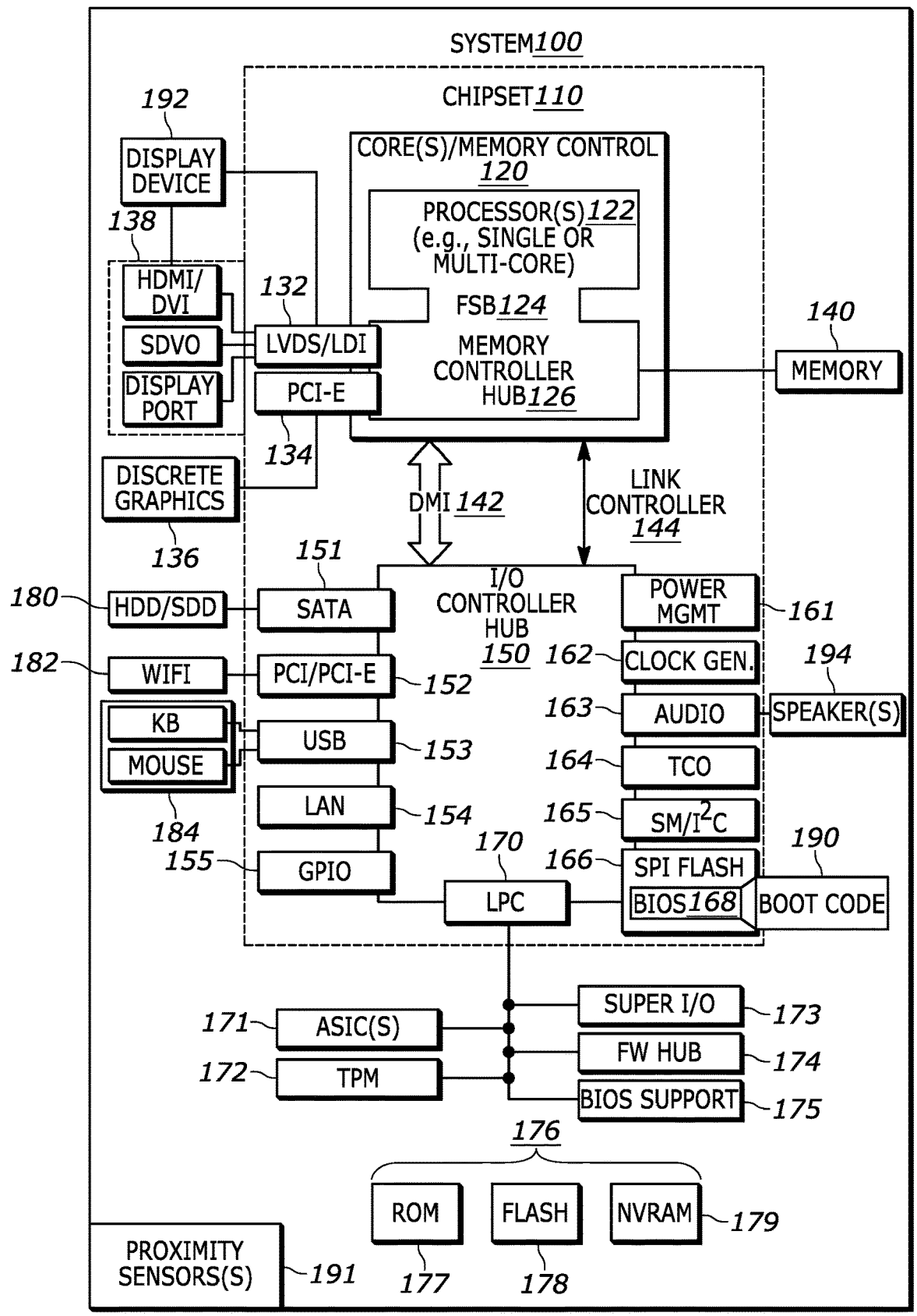
FIG. 1 is a block diagram of an example system consistent with present principles.

With the proliferation of more autonomous driving features, vehicles can be programmed with safety features including lane assist, adaptive cruise, and emergency braking, while permitting the driver to take manual control as needed.

Present principles leverage those times that the autonomous driving features are overridden by capturing and communicating autonomous override events to the cloud to render a real time picture of road conditions for other users driving the same route. A cloud server receiving indications of autonomous driving feature overrides at a particular road location may transmit to other vehicles an audio or visual notification to other vehicles to be aware of a possible road hazard even if the cause of the possible road hazard is not precisely known. The server may triangulate where the road problem is using locations of plural vehicles experiencing override near a particular location.

So for example, if one intersection is a problem and users are always overriding, the developer of the maps and/or autonomous driving application knows it should adjust its algorithm because auto-driving is not being performed correctly. If a user override occurs, the system can increase its lidar gain/sensitivity to ensure it detects something in the road.

In a first example use case, data is collected and transmitted indicating that many cars in the center lane of I-40 right at mile marker 295 are having to override the lane assist feature and swerve left. The cloud based system receiving override reports identifies a possible obstruction in the road and transmits warning signals to other vehicles. Upon receiving indication that following vehicles do not have to swerve or override any more, the cloud based system may rule it as no longer an issue and remove the warning.

In a second example use case, indication may be received of cars tapping brakes to disengage adaptive cruise at the same spot on the road. This could be identified as a speed trap or perhaps onlooker distraction. This too can be communicated back to other users using the same route via their mapping app or interface so that they are made aware of an upcoming event to watch out for.

Prior to delving further into the details of the instant techniques, note with respect to any computer systems discussed herein that a system may include server and client components connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino CA, Google Inc. of Mountain View, CA, or Microsoft Corp. of Redmond, WA A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to C#or C++, and can be stored on or transmitted through a computer-readable storage medium (that is not a transitory, propagating signal per se) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, NC, or a workstation computer, such as the ThinkStation®, which are sold by Lenovo (US) Inc. of Morrisville, NC; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, though not shown for simplicity, in some embodiments the system 100 may include a gyroscope that senses and/or measures the orientation of the system 100 and provides input related thereto to the processor 122, as well as an accelerometer that senses acceleration and/or movement of the system 100 and provides input related thereto to the processor 122. Still further, the system 100 may include an audio receiver/microphone that provides input from the microphone to the processor 122 based on audio that is detected, such as via a user providing audible input to the microphone, and a camera that gathers one or more images and provides input related thereto to the processor 122. The camera may be a thermal imaging camera, an infrared (IR) camera, a digital camera such as a webcam, a three-dimensional (3D) camera, and/or a camera otherwise integrated into the system 100 and controllable by the processor 122 to gather pictures/images and/or video. Also, the system 100 may include a GPS transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
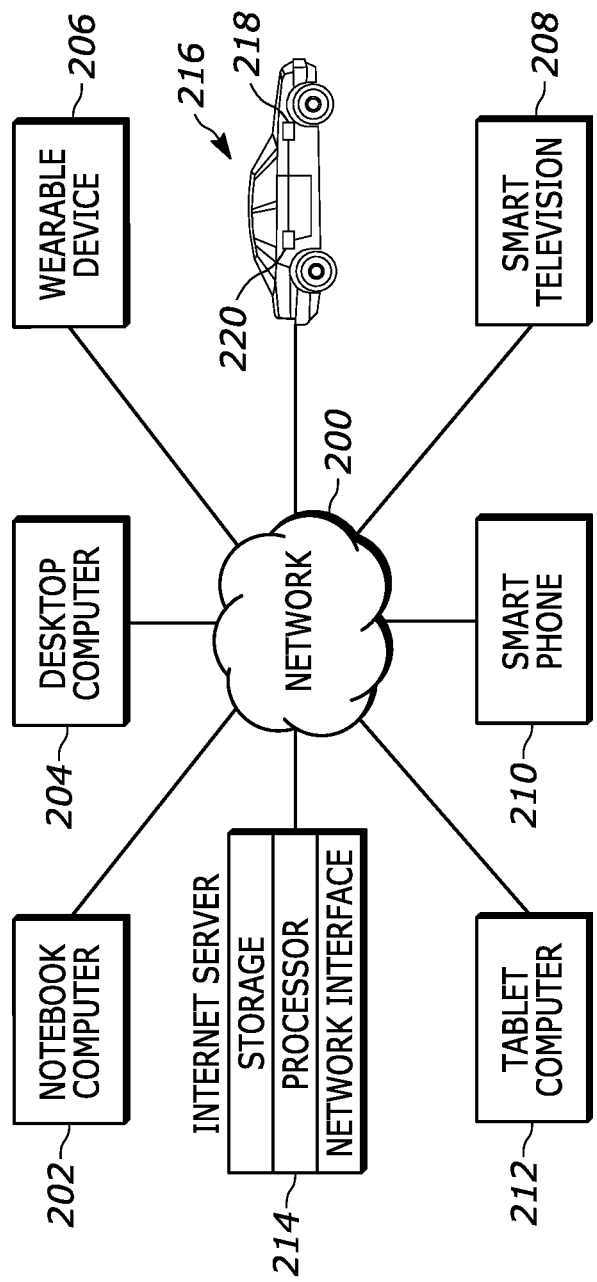
FIG. 2 is a block diagram of an example network of devices consistent with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, a vehicle 216, and a server 214 such as an Internet server that may provide cloud storage accessible to the devices 202-212, 216. It is to be understood that the devices 202-216 are configured to communicate with each other over the network 200 to undertake present principles.

Describing the vehicle 216 in greater detail, it may be an automobile such as a car or truck. The vehicle 216 may include one or more sensors 218 for sensing current driving conditions in accordance with present principles as set forth further below. For example, the sensor(s) 218 may include a camera, a water sensor, a humidity sensor, a temperature sensor, a laser rangefinder and/or lidar, etc. The sensor(s) 218 may provide input to an on-board computer 220 of the vehicle 216 that has been programmed to perform autonomous driving of the vehicle 216 without a human driver controlling the steering, power, and/or braking mechanisms of the vehicle 216. However, note that the on-board computer 220 may still permit manual driving by the human driver for all or part of driving to a destination.

Regarding manual driving, it is to be understood in the context of the present application that "manual driving" may include a human driver controlling the steering, power, and/or braking mechanisms of the vehicle 216 to travel in the vehicle 216 using, e.g., a steering wheel, gas pedal, and brake pedal of the vehicle 216, even if the vehicle 218 has an automatic transmission.

Figure 3:
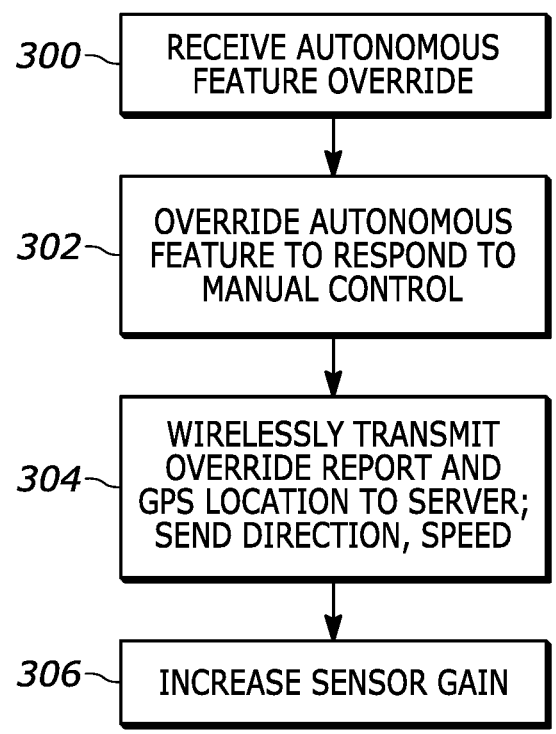
FIG. 3 is a flow chart of example vehicle logic consistent with present principles.

Now referring to FIG. 3, example logic is illustrated that may be executed by a vehicle such as the vehicle 216 shown in FIG. 2. Beginning at block 300, an override of an autonomous driving feature is received. By way of example and not of limitation, the override may be generated by a driver of the vehicle depressing the brake pedal when the vehicle is in cruise control mode. Or, the override may be generated by a person manipulating a user interface control to command override of a particular autonomous driving feature or features. Or the override may be generated by a person grabbing and moving the vehicle's steering wheel to turn the vehicle left or right.

Moving to block 302, the affected autonomous driving feature is overridden and the vehicle responds to manual control of the particular driving parameter being affected, e.g., speed control or steering control or other control. Proceeding to block 304, in example embodiments the vehicle wirelessly transmits a signal to the "cloud", i.e., to one or more network servers indicating the autonomous driving feature that has been overridden, the time it was overridden, the vehicle's location at the time of override as indicated by, e.g., GPS, and the vehicle's course and speed at the time the autonomous driving feature was overridden. If desired, the logic may move to block 306 to automatically increase a gain of a road sensor on the vehicle such as but not limited to a light detection and ranging (LIDAR) sensor.

FIG. 4 illustrates example server-side logic. Commencing at block 400, the server wirelessly receives from a vehicle the indication of autonomous driving feature override sent at block 304 in FIG. 3, along with the other information sent by the vehicle. In an example, moving to decision diamond 402 the server may determine whether a threshold number of vehicles have reported autonomous driving feature override. The threshold number may be as low as one but typically is higher (e.g., one hundred or more). A count of override reports may be incremented each time an override report is received, if desired within a threshold distance of a location such as the location received at block 400 and if desired within a threshold time period of the report received at block 400. The count may be incremented for any override report or only for reports indicating that the same common feature was overridden. In examples implementing the test at decision diamond 402, a negative result loops the logic back to block 400 to await another override report.

Otherwise, the logic proceeds to block 404 to determine a location of a possible hazard. This may be done simply by using a location in the geographic center of locations received at block 400 from multiple vehicles, such as by triangulating GPS locations received at block 400. Or it may be done by selecting a location that is common to a threshold number of reporting vehicles. The location of a single reporting vehicle may also be used. Other means to determine a possible hazard location may also be used. In any case, the location is then transmitted wirelessly to other vehicles, typically other vehicles using autonomous systems networked to the cloud. The location may be broadcast to all vehicles in the system or multicast only to vehicles within a threshold range of the location of the possible hazard and/or only to vehicles traveling toward the location of the possible hazard.

In some examples the logic may execute a test at decision diamond 406 to determine whether no further reports of autonomous driving feature overrides have been received near the location determined at block 404 within a timeous period (e.g., five minutes). If no further reports have been received, indicating that whatever the hazard was that was causing drivers to override autonomous driving, the hazard no longer exists, the logic may move to block 408 to terminate the transmission of alerts at block 404. Information pertaining to the location and the autonomous driving features that were overridden may be provided at block 410 to application developers of, e.g., map applications and autonomous driving programs for adjustment of the apps/programs.

FIG. 5 shows a user interface (UI) with various settings that may be presented on an audio and/or video and/or tactile display 502 of the vehicle 216. The UI 500 may include an audible and/or visual and/or haptic warning 504 of a possible hazard ahead including an indication of how far ahead the hazard is (e.g., two hundred feed), in response to receiving the alert transmitted by the server at block 404 in FIG. 4. The UI 500 may also include at least a first selector 506 that is selectable to enable or configure the device to undertake present principles, in the example shown, to cause one or more autonomous driving features to be immediately disabled in the vehicle. The UI 500 may also include a second selector 508 selectable to increase or decrease the gain (sensitivity) of the vehicle's road sensor(s).

It may now be appreciated that present principles provide for an improved computer-based user interface that improves the functionality and ease of use of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A non-transitory computer readable storage medium (CRSM), the non-transitory CRSM comprising instructions executable by at least one processor to:
   receive from a first vehicle a signal indicating that at least one autonomous driving feature of the first vehicle has been overridden;
   receive from the first vehicle indication of a location of the first vehicle; and
   responsive to the signal indicating that the at least one autonomous driving feature of the first vehicle has been overridden and based at least in part on the location, increase a gain of one or more sensors on a second vehicle to sense one or more current driving conditions.

2. The non-transitory CRSM of claim 1, wherein the signal is a first signal, wherein the location is a first location, and wherein the instructions are executable to:
   receive from the second vehicle a second signal indicating that at least one autonomous driving feature of the second vehicle has been overridden, the second vehicle being different from the first vehicle;
   receive from the second vehicle indication of a second location of the second vehicle; and
   responsive to the first and second signals and based on the first and second locations being within a first distance of each other, transmit to plural vehicles one or more third signals indicating an alert.

3. The non-transitory CRSM of claim 1, wherein the CRSM is implemented in a network server.

4. The non-transitory CRSM of claim 3, wherein the network server is a maps application server.

5. The non-transitory CRSM of claim 1, wherein the instructions are executable to:
   transmit to plural vehicles one or more alerts responsive to the signal indicating that the at least one autonomous driving feature of the first vehicle has been overridden and responsive to determining that at least a first number of vehicles other than the first vehicle have reported respective overrides of respective autonomous driving features.

6. The non-transitory CRSM of claim 1, wherein the instructions are executable to:
   transmit to plural vehicles one or more alerts responsive to the signal indicating that the at least one autonomous driving feature of the first vehicle has been overridden and responsive to determining that at least a first number of vehicles other than the first vehicle have reported respective overrides of respective autonomous driving features within a first distance of the location of the first vehicle.

7. The non-transitory CRSM of claim 1, wherein the instructions are executable to:
   transmit to plural vehicles one or more alerts responsive to the signal indicating that the at least one autonomous driving feature of the first vehicle has been overridden and responsive to determining that at least a first number of vehicles other than the first vehicle have reported respective overrides of respective autonomous driving features within a first distance of the location of the first vehicle within a first period with respect to a time associated with the signal.

8. The non-transitory CRSM of claim 1, wherein the instructions are executable to:
   provide to at least one developer of a driving application and/or an autonomous driving feature program indication of the signal indicating that the at least one autonomous driving feature of the first vehicle has been overridden.

9. The non-transitory CRSM of claim 1, wherein the instructions are executable to:
   responsive to the signal indicating that the at least one autonomous driving feature of the first vehicle has been overridden and responsive to receiving a time of override for the first vehicle, a location of override for the first vehicle, and a speed at time of override for the first vehicle, increase the gain of the one or more sensors on the second vehicle.

10. The non-transitory CRSM of claim 1, wherein the second vehicle is different from the first vehicle.

11. A device, comprising:
    at least one processor; and
    storage accessible to the at least one processor and comprising instructions executable by the at least one processor to:
    receive from a first vehicle a signal indicating that at least one autonomous driving feature of the first vehicle has been overridden;
    receive from the first vehicle indication of a location of the first vehicle; and
    responsive to the signal indicating that the at least one autonomous driving feature of the first vehicle has been overridden and based at least in part on the location, increase a gain of one or more sensors on a second vehicle to sense one or more current driving conditions.

12. The device of claim 11, wherein the signal is a first signal, wherein the location is a first location, and wherein the instructions are executable to:
    receive from the second vehicle a second signal indicating that at least one autonomous driving feature of the second vehicle has been overridden, the second vehicle being different from the first vehicle;

receive from the second vehicle indication of a second location of the second vehicle; and responsive to the first and second signals and based on the first and second locations being within a first distance of each other, transmit to plural vehicles one or more third signals indicating an alert.

13. The device of claim 11, wherein the device is a maps application server.

14. The device of claim 11, wherein the instructions are executable to:

increase the gain of the one or more sensors responsive to the signal indicating that the at least one autonomous driving feature of the first vehicle has been overridden and responsive to determining that at least a first number of vehicles other than the first vehicle have reported respective overrides of respective autonomous driving features.

15. The device of claim 11, wherein the instructions are executable to:

increase the gain of the one or more sensors responsive to the signal indicating that the at least one autonomous driving feature of the first vehicle has been overridden and responsive to determining that at least a first number of vehicles other than the first vehicle have reported respective overrides of respective autonomous driving features within a first distance of the location of the first vehicle.

16. The device of claim 11, wherein the instructions are executable to:

increase the gain of the one or more sensors responsive to the signal indicating that the at least one autonomous driving feature of the first vehicle has been overridden and responsive to determining that at least a first number of vehicles other than the first vehicle have reported respective overrides of respective autonomous driving features within a first distance of the location of the first vehicle within a first period with respect to a time associated with the signal.

17. The device of claim 11, wherein the instructions are executable to:

responsive to the signal indicating that the at least one autonomous driving feature of the first vehicle has been overridden and responsive to receiving a time of override for the first vehicle, a location of override for the first vehicle, and a speed at the time of override for the first vehicle, increase the gain of the one or more sensors on the second vehicle.

18. The device of claim 11, wherein the one or more sensors comprise one or more of: a camera, a water sensor, a humidity sensor, a temperature sensor, a laser rangefinder, and/or a light detection and ranging (LIDAR) sensor.

19. A method, comprising:

receiving from a first vehicle a signal indicating that at least one autonomous driving feature of the first vehicle has been overridden;

receiving from the first vehicle indication of a location of the first vehicle; and responsive to the signal indicating that the at least one autonomous driving feature of the first vehicle has been overridden and based at least in part on the location, increasing a gain of one or more sensors on a second vehicle to sense one or more current driving conditions.

20. The method of claim 19, wherein the method is implemented by a driving application server, and wherein the method comprises:

responsive to the signal indicating that the at least one autonomous driving feature of the first vehicle has been overridden and responsive to receiving a time of override for the first vehicle and a location of override for the first vehicle, increasing the gain of the one or more sensors on the second vehicle.

* * * * *